UNITED STATES PATENT OFFICE.

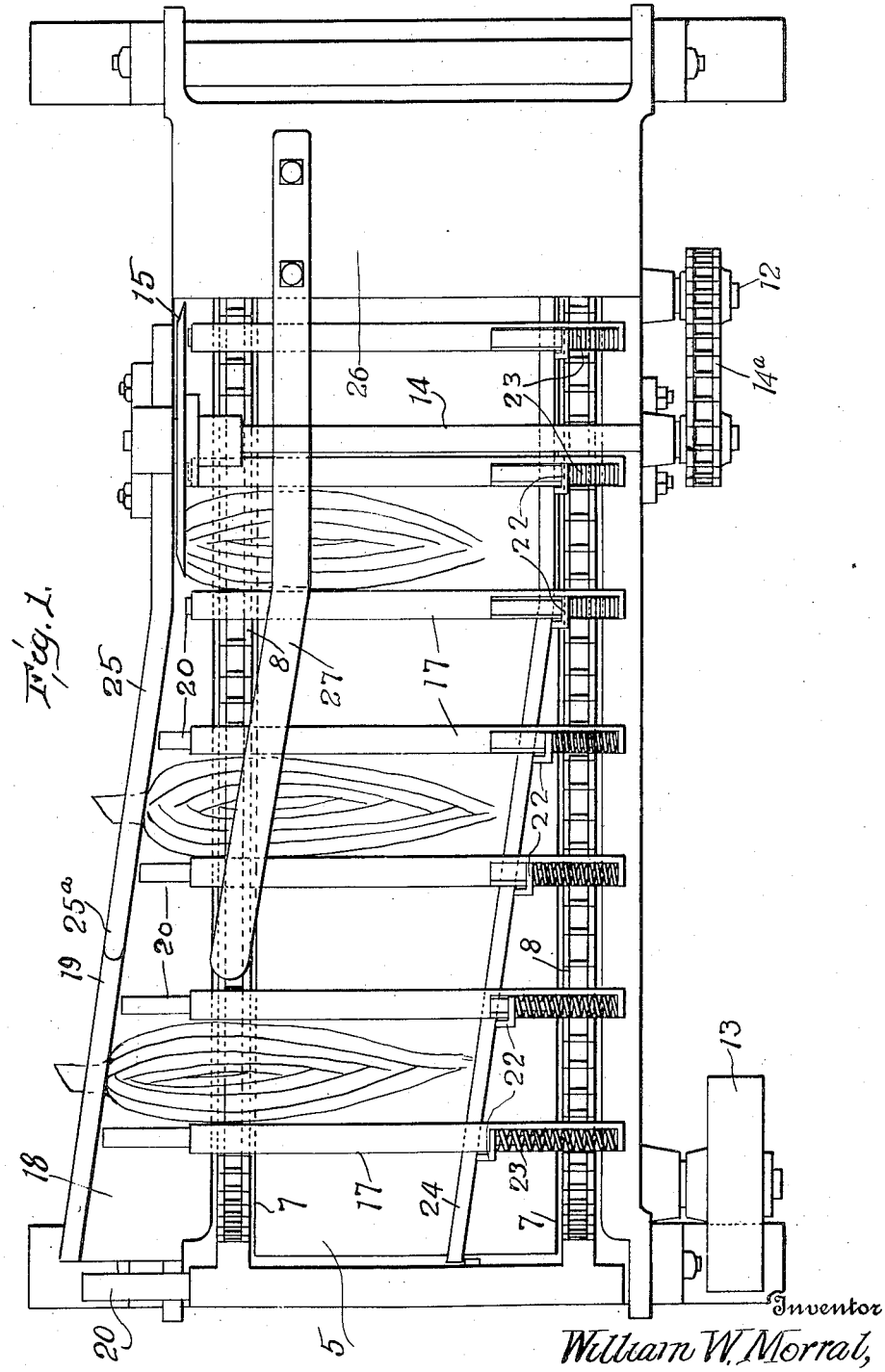

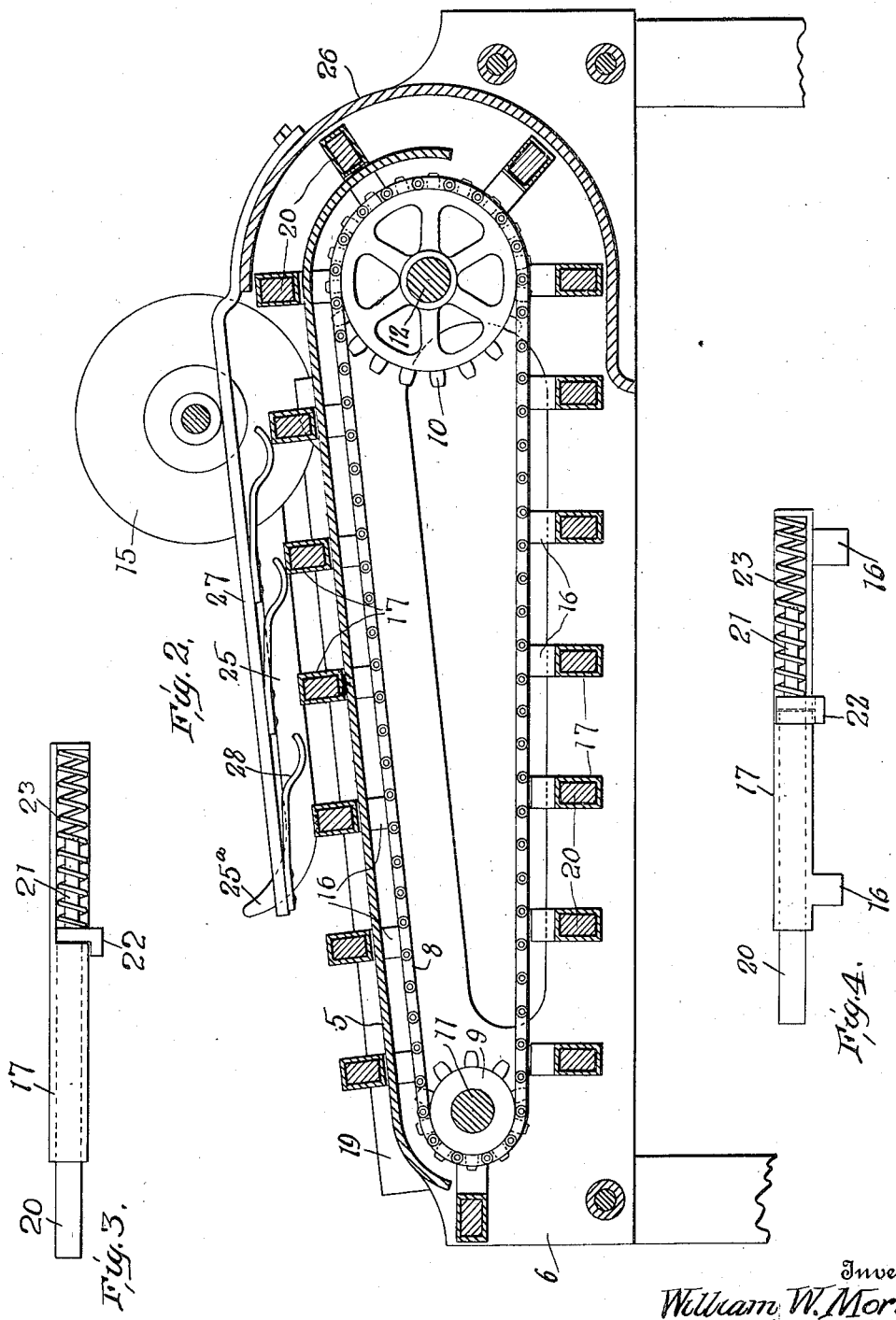

WILLIAM W. MORRAL, OF MORRAL, OHIO, ASSIGNOR OF ONE-HALF TO SAMUEL E. MORRAL, OF MORRAL, OHIO.

CORN-BUTTING MACHINE.

1,083,693.  Specification of Letters Patent.  Patented Jan. 6, 1914.

Application filed December 4, 1912. Serial No. 734,836.

*To all whom it may concern:*

Be it known that I, WILLIAM W. MORRAL, a citizen of the United States, residing at Morral, in the county of Marion and State of Ohio, have invented certain new and useful Improvements in Corn-Butting Machines, of which the following is a specification, reference being had therein to the accompanying drawing.

This invention relates to new and useful improvements in corn butting machines and is in the nature of improvements on the means for feeding ears of corn to the butt-removing device as shown in the machine for which application for patent was filed by S. E. and W. W. Morral on Dec. 23, 1909, Ser. No. 534,583.

In machines of the above type, some difficulty has been experienced in feeding small ears and nubbins to the butt-removing device on account of the feed rolls not properly grasping such short ears and nubbins.

The principal object of this invention is to provide a means for moving ears of corn, regardless of size, to a butt-removing device, so as to positively position said ears in proper relation to the butt-removing device to be acted upon by said device, and to this end the invention comprises a feeding device, a butt-removing device and an inclined guide which coöperates with the feeding device to direct the ears inwardly to the butt-removing device.

Another important object of the invention is to provide the feeding device with a plurality of extensible arms which are automatically drawn inwardly as the feeding device moves along the guide, said arms serving to carry the ears of corn to the butt-removing device.

A further object of the invention is to provide a novel means for yieldably holding the ears of corn upon the feeding means, while said ears are being acted upon by the butt-removing device.

In the accompanying drawings forming a part of this application, Figure 1 is a top plan view of the machine, Fig. 2 is a vertical longitudinal sectional view therethrough, Fig. 3 is a detail top plan view of one of the extensible arms, and Fig. 4 is a side elevation thereof.

In carrying out my invention, I provide a support or table with a feeding device arranged to move the ears of corn along the same. Arranged at one side of, and at the rear end of the support is a device for removing the butt ends of the ears which are being moved by the feeding means. The support is provided on the same side as the butt-removing device with a lateral extension, and this extension is arranged in advance of the butt-removing device and is formed with a guide which extends inwardly at an inclination to the line of movement of the feeding device, and is adapted to coöperate with said feeding device to direct the ears inwardly to the butt-removing device. In order to properly feed ears of different sizes to the butt-removing device, the feeding device is provided with a series of spaced transversely disposed arms, each arm being provided with an extensible arm which coöperates with the guide and is automatically retracted as the feeding device is moved along said guide. In order to retain the ears upon the feeding device when being operated upon by the butt-removing device there is provided a means for yieldably holding said ears upon the feeding device.

In the present drawing I have illustrated one embodiment of the invention and have shown a support or table 5, which is mounted upon a suitable frame 6. This support is formed with spaced longitudinal slots 7—7, and operating directly below these slots is a feeding device, which in this instance comprises spaced endless chains 8—8. These chains are each driven by front and rear sprocket wheels 9 and 10, which are respectively mounted on front and rear transverse shafts 11 and 12, said shafts being suitably supported on the frame 6. The front shaft 11 is preferably employed as a drive shaft and is provided with a band pulley 13, which may be driven from any suitable power not shown.

Supported in suitable bearings at the rear end of the frame is a transverse shaft 14, which is provided at one end with a butt-removing device, which in this instance, is shown as a rotary cutter 15. The shaft 14 is operatively connected to the feeding device through the medium of the sprocket chain 14ª, said chain operating over sprocket wheels mounted on the shafts 12 and 14.

In order to feed the ears of corn to the butt-removing device 15, the sprocket chains 8 are provided with short arms 16, which extend upwardly through the slots 7 of the support. These arms are arranged in transverse pairs and to each pair of arms is attached a transversely disposed feeding arm 17, these arms being so positioned that when being moved by the chains, they will pass inside of the butt-removing device 15.

In order to properly feed the ears of corn, regardless of the size of the said ears, to the butt-removing device 15, I have provided the support 5 with a lateral extension 18. This extension is disposed on the same side of the support as the butt-removing device, but is arranged in advance of said device. A guide 19, which in this instance is in the form of a bar or rail, is secured to the outer edge of the extension and has its forward portion extending inwardly at an inclination, or obliquely, to the line of movement of the feeding device. The rear portion of this guide 19, extends rearwardly in a plane parallel to the line of movement of the feeding device, the last mentioned portion of the guide beginning at a point slightly in advance of the butt-removing device. If only large ears were to be butted by this machine, the ears would be positioned between respective pairs of arms 17, with their butt ends bearing against the guide 19. The feeding device would then carry the ears rearwardly, and the guide 19 would cause said ears to be positively moved inwardly so that when said ears approached the cutter 15, they would be in proper position to be operated upon by said cutter. Should however it be desired to remove the butt ends from small ears or nubbins, these ears or nubbins would not be fed properly to the cutter 15, because of the distance between the arms 17 and the guide 19. Therefore in order to positively feed and guide such small ears and nubbins, each arm 17 is provided with an extensible arm 20, which extends toward the guide 19. This extensible arm is telescopically arranged within the arm 17, and is provided at its rear end with a reduced portion or stem 21 and in advance of said portion with a depending finger 22, and the rear end of each arm 17 is open at one side to permit the finger 22 to slide. Disposed around the stem 21, between the finger 22 and the rear end of the arm 17, is a coil spring 23, which serves to yieldably retain the extensible arm 20 in its projected relation and in close proximity to the guide 19.

In order to prevent the extensible arms 20 from striking the guide 19 when the feeding device is in operation, I have provided a guide track 24, which is carried by the support 5 and is disposed in parallel relation to the guide 19. The depending fingers 22 of the extensible arms 20 have sliding engagement with the guide track 24, so that as the feeding device is operated, the extensible arms 20 will be automatically retracted against the tension of their respective springs 23. The guide track 24 terminates at its rear end slightly in rear of the cutter 15, and as result, as soon as the arms 17 pass beyond the guide track 24 the fingers 23 will of course become disengaged from said track and the springs 23 will automatically return the extensible arms 20 to their normal projected positions.

In order to retain the butt ends of the ears upon the guide 19 while being acted upon by the cutter 15, I have provided an upper guide 25, which is disposed in alinement with, and directly above the rear portion of said guide 19, the forward end of the upper guide being upwardly curved as shown at 25$^a$ to facilitate the entrance of the butt ends between the two guides.

The rear end of the feeding device is inclosed by a casing 26, which serves to retain the ears of corn between the arms 17 until said ears are guided around and below the support 5 to a point where they are discharged.

There is a tendency for the ears, when being acted upon by the butt-removing device 15, to have their inner ends elevated from the support 5, and in order to overcome this objection, the casing is provided with a forwardly extending longitudinally disposed arm 27. This arm extends above and in spaced relation to the transverse feeding arms 17, and secured to the under side of the arm 27 is a plurality of longitudinally disposed spring fingers 28, said fingers having their forward ends connected to the arm and having their rear or free ends curved downwardly for engagement with the ears of corn.

In practice, ears of corn are placed upon the support 5 between adjacent feeding arms 17 and have their butt ends bearing upon the guide 19. The feeding device then carries these ears rearwardly over the support 5, and the guide 19 serves to positively move said ears inwardly to a position to be acted upon by the butt-removing device 15. As the ears are thus moved rearwardly, they are yieldably held upon the support 5, by means of the spring fingers 28, and as a result, these ears are firmly held upon the support while being acted upon by the butt-removing device or cutter 15. The ears are then guided around and under the rear end of the machine through the medium of the casing 26, and after passing said casing, the ears are discharged as will be readily understood.

It will be observed that by means of the lateral extension 18 small ears may be placed thereon with their butt-ends against the guide 19. As a result the extension 18 and the guide 19 coöperate with the feeding device to feed various sized ears of corn past the butter. It will also be observed that the front end-portion of the guide 19 serves to retain the butt-ends of the ears in operative relation to said butter while the ears are being carried thereunder.

While I have shown and described one embodiment of my invention it will be understood that this has been chosen for the purposes of illustration only and that I do not desire to be limited to the details of construction shown and described, for obvious modifications will occur to a person skilled in the art. For example, while I have shown and described the feeding means as traveling in a straight longitudinal path along the support, it is obvious that the feeding means may travel in a circuitous path, such for instance as is shown in the patent reissued to John Morral January 21st, 1913. No. 13,518.

Having thus fully described my invention, what I claim as new and desire to secure by Letters Patent, is:—

1. In a machine of the character described, a support, a guide arranged obliquely to the length of said support, a cutter arranged between said guide and said support near one end of the former, and a feeding mechanism arranged to move longitudinally of the support and having laterally movable devices to bridge the space between said guide and said support.

2. In a machine of the character described, a support, a guide arranged obliquely to the length of said support, a cutter arranged between said guide and said support near one end of the former, a feeding mechanism arranged to move longitudinally of the support and having laterally movable devices to bridge the space between said guide and said support, and means to positively control the positions of said laterally movable devices.

3. In a machine for the purpose set forth, the combination with a butt-removing device, of means for feeding ears of corn past the butt-removing device, and a guide arranged at an inclination to the line of movement to the feeding means and formed by members spaced apart to receive the stocks of said ears, whereby the butt-ends of the ears will be properly positioned in relation to the butt-removing device.

4. In a machine for the purpose set forth, the combination with a butt-removing device, of means including spring pressed arms for feeding ears of corn to the butt-removing device, and a guide arranged at an inclination to the line of movement of said means to direct the ears to said butt-removing device.

5. In a machine for the purpose set forth, the combination with a butt-removing device, of means including spring pressed arms for feeding ears of corn to the butt-removing device, a guide arranged at an inclination to the line of movement of said means to direct the ears to said butt-removing device, and means for retracting said arms during the travel thereof along said guide.

6. In a machine for the purpose set forth, the combination with a support and a butt-removing device, of means for feeding ears of corn along the support past the butt-removing device, a lateral extension projecting from the support, and a guide carried by said extension and arranged at an inclination to the line of movement of the feeding means for directing said ears to the butt-removing device.

7. In a machine for the purpose set forth, the combination with a support and a butt-removing device, said device being arranged at the rear end of and at one side of said support, of means for feeding ears of corn along the support past the butt-removing device, a lateral extension projecting from the support in advance of the butt-removing device, and a guide carried by said extension and arranged at an inclination to the line of movement of the feeding means for directing said ears to the butt-removing device.

8. In a machine for the purpose set forth, the combination with a support and a butt-removing device, of means including a plurality of spaced transverse feeding arms for feeding ears of corn along the support past the butt-removing device, a guide arranged at an inclination to the line of movement of the feeding means for directing the ears to said butt-removing device, and extension arms connected to the feeding arms and projecting toward said guide.

9. In a machine for the purpose set forth, the combination with a support and a butt-removing device, of means including a plurality of spaced transverse feeding arms for feeding ears of corn along the support past the butt-removing device, a guide arranged at an inclination to the line of movement of the feeding means for directing the ears to said butt-removing device, extension arms connected to the feeding arms and projecting toward said guide, and means to retract said extension arms as said feeding means approaches the butt-removing device.

10. In a machine for the purpose set forth, the combination with a support and a butt-removing device, of means including a plurality of spaced transverse feeding arms for feeding ears of corn along the support past the butt-removing device, a guide arranged at an inclination to the line of movement of the feeding means for directing the ears to said butt-removing device, extension arms connected to the feeding arms and projecting toward said guide, a guide track carried by the support and arranged parallel to said guide, and means carried by the extension arms and coöperating with said guide track to automatically retract said extension arms as the feeding means approaches the butt-removing device.

11. In a machine for the purpose set forth, the combination with a support and a butt-removing device, of means for feeding ears of corn along the support past said butt-removing device, and a guide arranged obliquely to the line of movement of the feeding means, said feeding means including an extensible element arranged at right angles to the line of movement of said feeding means and coöperating with said guide to direct the ears to said butt-removing device.

12. In a machine of the character described, a butt-removing device, mechanism to feed ears of corn to said butt-removing device, said mechanism including a laterally movable member, and a guide arranged obliquely to the line of movement of said mechanism to guide the ears of corn to said butt-removing device.

13. In a machine of the character described, a butt-removing device, mechanism to feed ears of corn to said butt-removing device, said mechanism including a laterally movable member, a guide arranged obliquely to the line of movement of said mechanism to guide the ears of corn to said butt-removing device, and means to control the lateral movement of said laterally movable member.

14. In a machine of the character described, a butt-removing device, mechanism to feed ears of corn to said butt-removing device, said mechanism including a spring-pressed laterally movable member, a guide arranged obliquely to the line of movement of said feeding mechanism to guide the ears of corn to said butt-removing device.

In testimony whereof, I affix my signature in presence of two witnesses.

WILLIAM W. MORRAL.

Witnesses:
  EARL M. WARNER,
  C. J. SCHULTZ.